(12) United States Patent
Erb et al.

(10) Patent No.: US 10,981,337 B2
(45) Date of Patent: Apr. 20, 2021

(54) BONDING OF THERMOPLASTIC COMPONENTS TO A THERMOSET COMPONENT

(71) Applicant: Dr. Ing. h.c. F. Porsche Aktiengesellschaft, Stuttgart (DE)

(72) Inventors: Ing. Thiemo Erb, Stuttgart (DE); Markus Brunner, Sachsenheim (DE); Benjamin Müller, Leutenbach (DE); Kersten Hauschildt, Schenefeld (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 225 days.

(21) Appl. No.: 16/130,047

(22) Filed: Sep. 13, 2018

(65) Prior Publication Data
US 2019/0111633 A1  Apr. 18, 2019

(30) Foreign Application Priority Data

Oct. 12, 2017 (DE) .......................... 102017123751.8

(51) Int. Cl.
*B32B 37/00* (2006.01)
*B29C 65/00* (2006.01)
(Continued)

(52) U.S. Cl.
CPC ............ *B29C 66/721* (2013.01); *B29C 45/14* (2013.01); *B29C 65/08* (2013.01); *B29C 66/02* (2013.01);
(Continued)

(58) Field of Classification Search
USPC ....................................................... 156/73.2
See application file for complete search history.

(56) References Cited

U.S. PATENT DOCUMENTS 8,881,367 B2   11/2014  Schmitt et al.
2011/0020572 A1   1/2011  Malek et al.
(Continued)

FOREIGN PATENT DOCUMENTS

CN        1799827 A       7/2006
DE     102008059243 A1    5/2010
(Continued)

OTHER PUBLICATIONS

Chinese Office Action for Chinese Application No. 2018111782763m dated Aug. 28, 2020, 7 pages.

*Primary Examiner* — James D Sells
(74) *Attorney, Agent, or Firm* — RatnerPrestia

(57) ABSTRACT

A process for producing a component from a fiber-reinforced plastic with a thermoset matrix. The process includes the steps providing a first and second thermoset prepreg layer, producing a cutout in the first thermoset prepreg layer, providing a thermoplastic layer in the semifinished product between the first and the second thermoset prepreg layer in the region of the cutout, and manufacturing the component with a first and second thermoset layer and a thermoplastic layer in the region of the cutout, where the thermoplastic layer is locked between the two thermoset layers. The component may be used in a vehicle, where the component has been produced from a fiber-reinforced plastic with a thermoset matrix by the abovementioned process.

10 Claims, 2 Drawing Sheets

(51) Int. Cl.
*B29C 45/14* (2006.01)
*B29C 65/08* (2006.01)
*B29L 31/30* (2006.01)

(52) U.S. Cl.
CPC .......... *B29C 66/112* (2013.01); *B29C 66/114* (2013.01); *B29C 66/1122* (2013.01); *B29C 66/474* (2013.01); *B29C 66/712* (2013.01); *B29C 66/7392* (2013.01); *B29C 66/7394* (2013.01); *B29C 66/73921* (2013.01); *B29C 66/7212* (2013.01); *B29L 2031/30* (2013.01)

(56) References Cited

U.S. PATENT DOCUMENTS

2015/0165746 A1* 6/2015 Prebil .................... B32B 37/02
156/64
2018/0126885 A1 5/2018 Hartmann et al.

FOREIGN PATENT DOCUMENTS

DE 102009034767 A1 1/2011
DE 102015206962 A1 10/2016
DE 102015007575 A1 12/2016

* cited by examiner

BONDING OF THERMOPLASTIC COMPONENTS TO A THERMOSET COMPONENT

CROSS-REFERENCE TO RELATED APPLICATION

This application claims priority to German Patent Application No. DE 10 2017 123 751.8, filed Oct. 12, 2017, which is incorporated by reference herein in its entirety.

FIELD OF THE INVENTION

The present invention relates to a process for the production of a component produced from a fiber-reinforced plastic with a thermoset matrix, for use in a vehicle.

The invention moreover relates to a component for use in a vehicle, where the component has been produced from a fiber-reinforced plastic with a thermoset matrix by the abovementioned process.

The invention additionally provides a vehicle with an abovementioned component made of a fiber-reinforced plastic with a thermoset matrix.

BACKGROUND OF THE INVENTION

Vehicle parts of lightweight design are increasingly used in automobile construction. These components are typically produced from fiber-reinforced plastics with a thermoset matrix. A resultant problem is that there are various functions that cannot be realized in a suitable manner by using these fiber-reinforced plastics with a thermoset matrix. These functions can often be realized successfully by using thermoplastics. Said functions relate by way of example to attachment of connector clips or screw domes, in order by way of example to attach the component on a vehicle chassis, or to connect it to other components, or in order to fix other components thereon.

The problem arising here is that injection molding cannot be used for direct bonding on fiber-reinforced plastics with thermoset matrix, for example based on woven glass fabric, woven carbon fabric or woven Kevlar fabric.

FIG. 1 depicts a corresponding approach from the prior art. FIG. 1 shows a layer 10 made of a fiber-reinforced plastic with thermoset matrix. The layer 10 has a cutout 12. A connector clip 14 has been inserted into the cutout 12, and the connector dip 14 here has supportive ribs 16 which bear on both sides of the layer 10 made of the fiber-reinforced plastic with the thermoset matrix, so that the connector clip 14 is held in the layer 10 made of the fiber-reinforced plastic with the thermoset matrix.

The connector dip 14 can be manufactured by way of example by applying the injection-molding composition for the connector clip 14, in liquid form, to both sides of the layer 10 made of the fiber-reinforced plastic with the thermoset matrix. The connector clip 14 is thus locked onto the layer 10 made of the fiber-reinforced plastic with the thermoset matrix. It is disadvantageous here that applications in visible areas are excluded by virtue of the through the layer 10 made of the fiber-reinforced plastic with the thermoset matrix.

In this connection, DE 10 2015 206 962 A1, which is incorporated by reference herein, discloses a structural module for a vehicle seat backrest. The structural module comprises a sheet-like element designed and configured to form at least a portion of a rear wall of the vehicle seat backrest and/or to seal a cutout for a load aperture in the vehicle seat backrest, and at least one stiffening element designed and configured to increase the stiffness of the sheet-like element, and/or at least one interface element designed and configured for connection to another component of the vehicle seat backrest. It is intended here that the sheet-like element has been produced from a thermoformable composite material and has coherent bonding to at least one portion of the stiffening element and/or of the interface element. The document moreover relates to a process for the production of a structural module.

DE 10 2008 059 243 A1, which is incorporated by reference herein, relates to a joining component for axial joining to a workpiece, with a main body which is made of a thermoplastic material and which has a holding section and a flange section, with a joining surface formed on the flange section, and with a metal section that can be heated inductively. The metal section here is integrated into the flange section.

DE 10 2009 034 767 A1, which is incorporated by reference herein, discloses structural organopanel components of hybrid construction made of an organopanel that is reinforced by means of thermoplastics and is suitable for the transmission of high mechanical loads, where particular flow aids are added to the thermoplastics in order to improve its physical properties.

DE 10 2015 007 575 A1, which is incorporated by reference herein, relates to a process for the production of a composite of metallic adherends and synthetic-fiber mats, where at least sections of the surface of a metallic adherend are roughened and structured with formation of undercuts in the surface of the latter by means of electromagnetic radiation, the roughened and structured sections are then positioned relative to a short-fiber woven fiber fabric or laid fiber scrim of a semifinished synthetic-mat product, a thermoset matrix system is injected into the woven fiber fabric or laid fiber scrim, the semifinished synthetic-mat product and at least those sections of the metallic adherend that have a roughened and structured surface are pressed against one another, whereupon at least those sections of the metallic adherend that have the roughened and structured surface are pressed into the thermoset matrix system, and the thermoset matrix material fills the undercuts of the roughened and structured surface of the metallic adherend, and then the thermoset matrix system of the semifinished synthetic-mat product is hardened via heating of same to form the composite.

SUMMARY OF THE INVENTION

On the basis of the abovementioned prior art, described herein is a process of the abovementioned type for the production of a component produced from a fiber-reinforced plastic with a thermoset matrix, for use in a vehicle, to provide a corresponding component that has been produced by the abovementioned process, and to provide a vehicle which comprises this component, where these permit simple and dependable bonding of thermoplastic components to thermoset components, with the intention of permitting use of the components in visible areas.

In particular, described herein is a process for the production of a component produced from a fiber-reinforced plastic with a thermoset matrix, for use in a vehicle, comprising the steps of provision of a first and second thermoset prepreg layer, production of a cutout in the first thermoset prepreg layer, provision of a thermoplastic layer in the semifinished product between the first and the second thermoset prepreg layer in the region of the cutout, and manufacturing of the component with a first and second thermoset layer and a thermoplastic layer in the region of the cutout, where the thermoplastic layer is locked between the two thermoset layers.

Described herein is a component for use in a vehicle, where the component has been produced from a fiber-reinforced plastic with a thermoset matrix by the abovementioned process.

Described herein is a vehicle with an abovementioned component made of a fiber-reinforced plastic with a thermoset matrix.

A concept underlying the present invention is therefore to provide, on the basis of the thermoplastic layer in the semifinished product, a layer of thermoplastic material that permits bonding of the component to components made of thermoplastic materials. The problem of lack of chemical bonding between thermoplastic materials and the thermoset layers is solved here in that the thermoplastic layer is mechanically locked into the component. There is therefore no requirement for chemical bonding. Because the thermoplastic layer is accessible only through one of the thermoset layers, specifically through the cutout formed therein, it is possible to provide the component with a uniform thermoset layer on one side. Possibilities for successful use of the component therefore include use in visible areas.

Prepreg is an English-language abbreviation for "preimpregnated fibers". Prepregs are semifinished textile fiber-matrix products which have been preimpregnated with reactive resins and which are hardened with exposure to heat and pressure in order to produce components. Reactive resins consist of a thermoset plastics matrix that is typically of high viscosity, but has not yet been polymerized. The fibers present can take the form of simple unidirectional layer, or a woven fabric or laid scrim. Prepreg is by way of example provided in the form of web wound onto rollers. The term prepreg here applies not only to unidirectionally reinforced or sheet-like semifinished products but also to other preforms of, in principle, any desired shape which consist, in the widest sense, of an uncured thermoset matrix comprising fibers. The matrix here is in the partially crosslinked state known as B-state, with paste-like to solid consistency, but can be returned to the liquid state by warming. Prepregs can be processed in machinery, and therefore have good suitability for automatic processing, with capability to provide components of uniform and high quality. Advantages of these are little undulation and high fiber volume content. Hardening at high temperatures can provide short cycle times.

Prepregs in principle comprise all semifinished thermoset fiber-matrix products. However, the term prepreg is used mainly for a continuous-fiber-reinforced semifinished thermoset product. Various types of reinforcement fibers can be used. However, in practice it is mainly glass fibers, basalt fibers, carbon fibers or aramid fibers that are processed to give prepregs.

The thermoplastic layer in the semifinished product relates to a layer made of a semifinished fiber product with thermoplastic matrix. These materials have the advantage that there is almost no limit to the number of times that they can be heated and molded. They can moreover be welded. However, a result of their low melting point is that, for example in contrast to semifinished thermoset products, they can only be used at relatively low temperatures. Semifinished thermoplastic products are divided by way of example into long-fiber-reinforced thermoplastics (LFT), glass-mat-reinforced thermoplastics (GMT) and thermoplastic prepregs.

It is preferable that the thermoplastic layer in the semifinished product has been formed locally in the region of the cutout. The thermoplastic layer in the semifinished product therefore extends across the cutout and an adjacent region. This reduces the cost of material for the production of the component and simplifies production. The thermoplastic layer is therefore formed only where the cutout has been arranged. The thermoplastic layer extends beyond the cutout in order to ensure stability between the thermoset layers, for example for thermoplastic structures attached thereon.

It is also possible in principle that one of the thermoset prepreg layers is locally delimited, for example in order to cover the thermoplastic layer in the semifinished product and to ensure retention of the thermoplastic layer between the thermoset layers.

In an advantageous embodiment of the invention, the process comprises an additional step of attachment of a thermoplastic structure on the thermoplastic layer via the cutout. The thermoplastic structure or thermoplastic component can by way of example be a standard part for use in automobile construction, in particular a screw dome or a fixing clip. There are various ways of providing appropriate thermoplastic structures and attaching these on the thermoplastic layer. It is thus possible to provide thermoset components which can easily be used with the thermoplastic structures for assembly and fixing.

In an advantageous embodiment of the invention, the step of attachment of a thermoplastic structure on the thermoplastic layer via the cutout comprises injection molding of a thermoplastic injection-molding material in the region of the cutout. The thermoplastic structure can therefore by way of example be fixed directly on the thermoplastic layer by injection molding, where the material of the thermoplastic structure, bonds securely to the material of the thermoplastic layer. Another option, consists in first using injection molding to attach an intermediate element on the thermoplastic layer, for example in order to fill the cutout with thermoplastic material, or to form a base, in principle of any desired type, for the attachment of the thermoplastic structure.

In an advantageous embodiment of the invention, the step of attachment of thermoplastic structure on the thermoplastic layer via the cutout comprises attachment of the thermoplastic structure by means of welding. Various welding processed are known per se. By way of example, the thermoplastic structure can be bonded via ultrasonic welding to the thermoplastic layer. The welding can be carried out manually, or can preferably be automated. The thermoplastic structure can therefore be prefabricated, in principle in any desired manner, and can then be bonded to the component. This method can provide a high degree of freedom in the design of the thermoplastic structure. There is no requirement to hold inventory of complex tooling or molds in order to attach the thermoplastic structure at a desired site on the component. Because of the various possible shapes of components, direct attachment of the thermoplastic structure on the component by injection molding can be more difficult than attachment of the prefabricated thermoplastic structure by welding.

In an advantageous embodiment of the invention, the step of provision of a thermoplastic layer in the semifinished product comprises provision of a thermoplastic organopanel, of a thermoplastic film or of a thermoplastic sheet. Organopanels are semifinished fiber-matrix products. They consist of a woven fiber fabric or of a laid fiber scrim, where these have been embedded into a thermoplastic matrix. The advantages of a thermoplastic matrix lie in the thermoformability of the semifinished products and the resultant shorter process times when comparison is made with conventional thermoset fiber-composite materials. Accordingly, processing of organopanels is easy. In a single-stage process, the fiber materials are heated and molded, and additional plastics elements are directly injected onto the material. These steps therefore, require only one machine, and time is additionally saved. This shaping method for organopanels has been derived from sheetmetal processing and has been further developed for the composite material. Fiber materials often used are glass, aramid and carbon. In the case of woven fabrics and laid scrims, the fibers can also run at right angles to one another, thus permitting precise definition of the mechanical properties of organopanels, for example stiffness, strength and thermal expansion. In contrast to sheet metal, tensile properties and compressive properties, and also other mechanical and thermal properties, are not isotropic. It is also possible here, in the semifinished product, to provide the thermoplastic layer in the form of preform. Thermoplastic film or thermoplastic sheet can also be used correspondingly, but preference is given to organopanels.

In an advantageous embodiment of the invention, the step of provision of a first and/or second thermoset prepreg layer comprises provision of a plurality of mutually superposed prepregs. The number of prepregs can be selected as required, for example as required by a desired strength. The first and second thermoset prepreg layer here can mutually independently comprise a different number of mutually superposed prepregs.

In an advantageous embodiment of the invention, the step of provision of a first and second thermoset prepreg layer comprises provision of a thermoset prepreg layer based on a fiber material made of glass, aramid, carbon or Kevlar in a thermoset matrix.

In an advantageous embodiment of the invention, the step of provision of a thermoplastic layer in the semifinished product comprises provision, in the semifinished product, of a thermoplastic layer based on a fiber material made of glass, aramid, carbon or Kevlar in a thermoplastic matrix.

Corresponding fiber materials have high strength and have good processing properties. The corresponding fiber materials moreover permit good moldability during the production of the component. The weight of the corresponding fiber materials also has good suitability for weight saving in automobile construction. This applies respectively not only to the thermoplastic layer in the semifinished product but also to each of the thermoset prepreg layers.

BRIEF DESCRIPTION OF THE DRAWING

The invention is explained via examples below, with reference to the attached drawings, on the basis of preferred embodiments, where the features described below can respectively represent an aspect of the invention either individually or in combination.

DETAILED DESCRIPTION OF THE INVENTION

Figure 4:
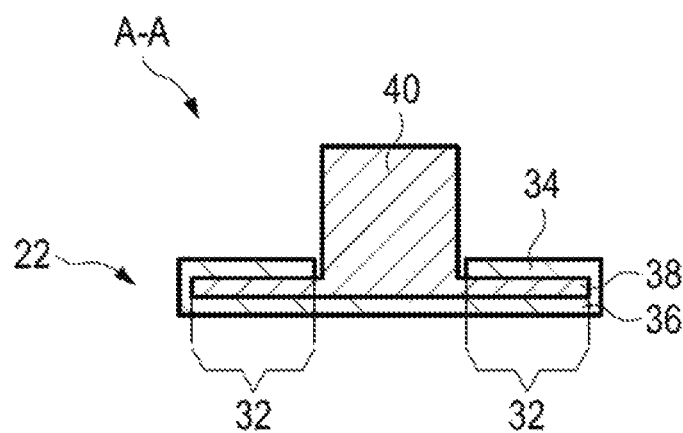
FIG. 4 is a sectional view of the component of FIG. 3 with the thermoplastic structure secured thereon in accordance with the first embodiment.
Figure 5:
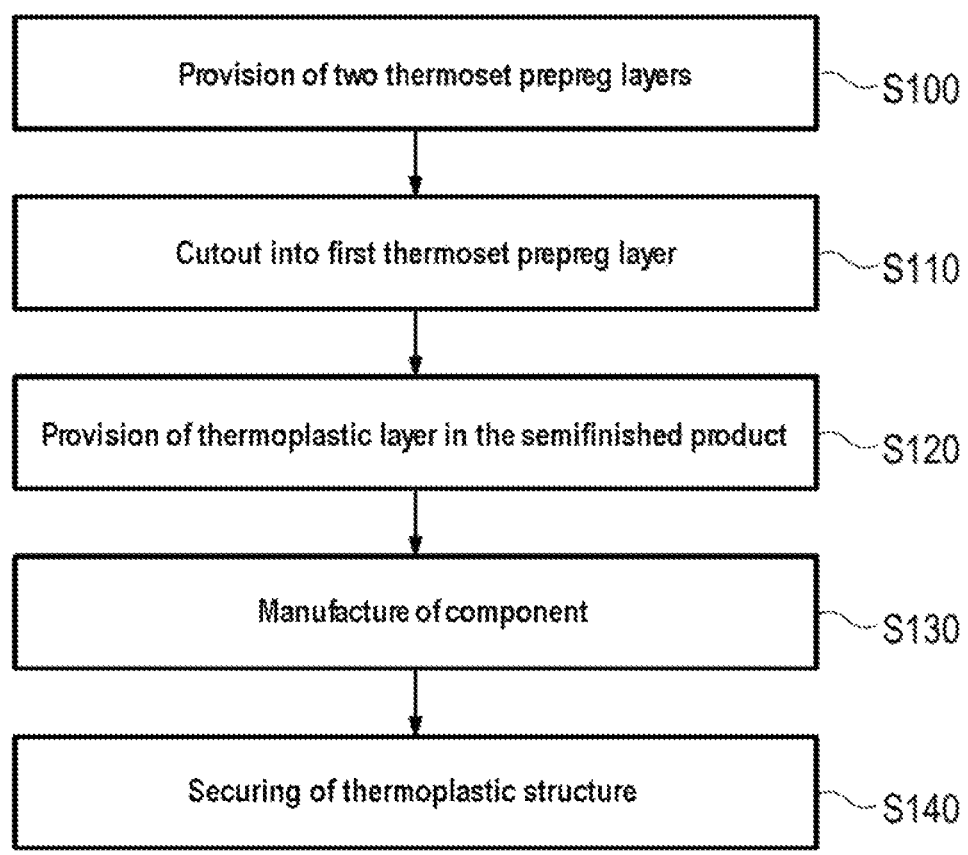
FIG. 5 is a low diagram for the production of the component of FIGS. 3 and 4 with the thermoplastic structure secured thereon in accordance with the first embodiment.

FIG. 5 shows a process for the production of a component produced from a fiber-reinforced plastic with a thermoset matrix, for use in a vehicle, in accordance with a first, preferred embodiment of the invention. The process of FIG. 5 is described below with additional reference to FIGS. 2 to 4.

Figure 1:
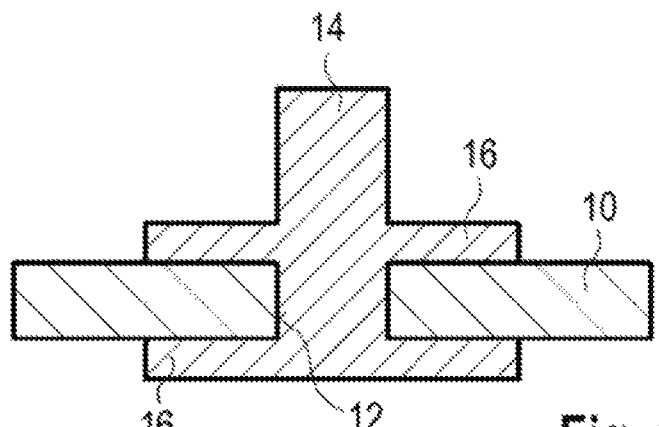
FIG. 1 is a diagrammatic sectional view of a thermoset component with hole and, fixed at said hole, a thermoplastic structure as in the prior art.
Figure 2:
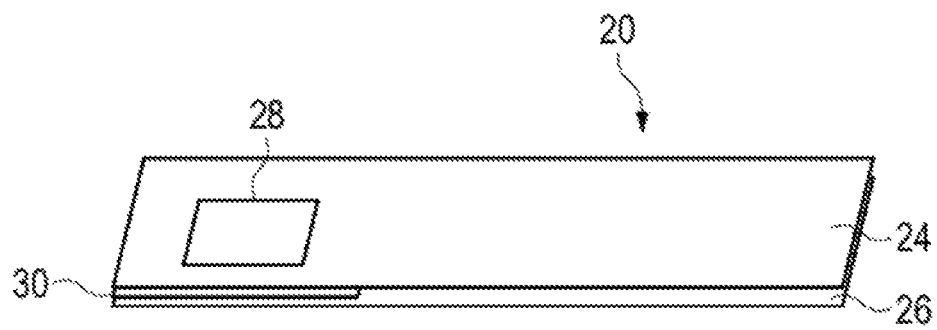
FIG. 2 is a diagrammatic perspective view of an arrangement of a first and second thermoset prepreg layer, where the first thermoset prepreg layer has a cutout, and of a thermoplastic layer in the semifinished product, for the production of a thermoset component in a first, preferred embodiment of the invention.

The process begins with step S100. Step S100 begins provision of an arrangement 20 for the production of a component 22. FIG. 2 shows the arrangement 20, where step S100 begins by providing a first and a second thermoset prepreg layer 24, 26.

The thermoset prepreg layers 24, 26 relate to layers with fibers which have been preimpregnated with reactive resins. The reactive resins consist of a thermoset plastics matrix which is typically of high viscosity but has not yet been polymerized. The fibers present can take the form of simple unidirectional layer, woven fabric, or laid scrim. The prepregs for the formation of the thermoset prepreg layers 24, 26 are provided here in the form of webs wound onto rollers. The prepregs relate to unidirectionally reinforced or sheet-like semifinished products, or else other preforms of, in principle, any desired shape. The prepreg layers 24, 26 are configured here as continuous-fiber-reinforced semifinished thermoset product based on a fiber material made of glass, aramid, carbon or Kevlar in a thermoset matrix. The matrix here is in the partially crosslinked state known as B-state, with paste-like to solid consistency, but can be returned to the liquid state by warming.

Step S110 produces a cutout 28 in the first thermoset prepreg layer 24. The shape of the cutout 28 here is rectangular. The cutout 28 can by way of example be produced by use of a cutter or punch.

Step S120 relates to provision of a thermoplastic layer 30 in the semifinished product between the first and the second thermoset prepreg layer 24, 26 in the region of the cutout 28. The thermoplastic layer 30 in the semifinished product here has been formed locally in the region of the cutout 28, and the thermoplastic layer 30 in the semifinished product here extends across the cutout 28 and additionally an adjacent region 32.

The thermoplastic layer 30 in the semifinished product relates to a layer made of a semifinished fiber product with thermoplastic matrix. The semifinished thermoplastic product here can be configured as long-fiber-reinforced thermoplastic (LFT), glass-mat-reinforced thermoplastic (GMT) or thermoplastic prepreg.

The thermoplastic layer 30 in the semifinished product here is configured as thermoplastic organopanel, i.e. as semifinished fiber-matrix product with a woven fiber fabric or with a laid fiber scrim, these having been embedded into a thermoplastic matrix. The thermoplastic layer 30 provided here in the semifinished product is based on a fiber material made of glass, aramid, carbon or Kevlar in a thermoplastic matrix.

In step S130, the component 22 is manufactured. For this, the arrangement 20 depicted in FIG. 2 is hardened with exposure to heat and pressure. The thermoplastic layer 30 here in the semifinished product also undergoes warming and shaping.

Figure 3:
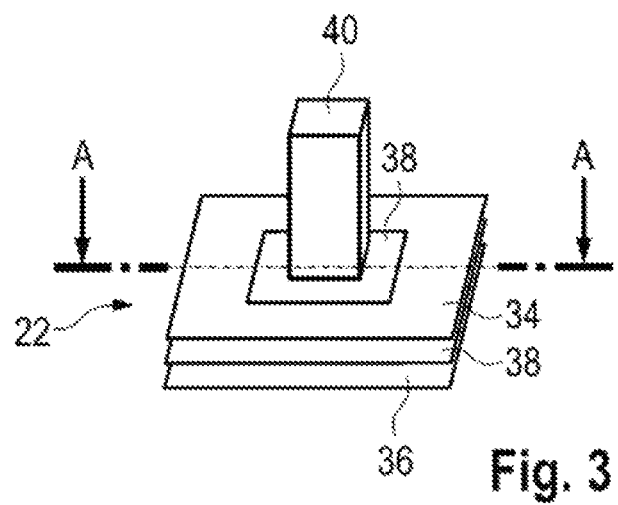
FIG. 3 is a diagrammatic Perspective view of a component, manufactured from the arrangement in FIG. 2, with a first and second thermoset layer and a thermoplastic layer, and also a thermoplastic structure secured thereon in accordance with the first embodiment.

The component 22 depicted in FIGS. 3 and 4, with a first and second thermoset layer 34, 36 and a thermoplastic layer 38 in the region of the cutout 28, is formed from the arrangement 20 with the two thermoset prepreg layers 24, 26 and, between these in the semifinished product, the thermoplastic layer 30. As can clearly be seen in particular in FIG. 4, the thermoplastic layer 38 is locked between the two thermoset layers 34, 36 in the finished component 22.

Step S140 fixes a thermoplastic structure 40 on the thermoplastic layer 38 via the cutout 28 by means of ultrasound welding. The thermoplastic structure 40 here, also termed thermoplastic component, is a standard part for use in automobile construction, in particular a screw dome or a fixing clip. Appropriate processes for automated ultrasound welding are known per se in the prior art.

What is claimed is:

1. A process for producing a component from a fiber-reinforced plastic with a thermoset matrix, the process comprising the steps of:
    forming a cutout in a first thermoset prepreg layer,
    positioning a thermoplastic layer between the first thermoset prepreg layer and a second thermoset prepreg layer in the region of the cutout in the first thermoset prepreg layer, and
    processing the component so that the thermoplastic layer is fixed between the first thermoset prepreg layer and the second thermoset prepreg layer,
    wherein the thermoplastic layer has a bottom surface, top surface and side surfaces, and
    wherein the bottom and side surfaces are covered by either one or both of the thermoset prepreg layers.

2. The process as claimed in claim 1, wherein the process further comprises attaching a thermoplastic structure on the thermoplastic layer at the cutout.

3. The process as claimed in claim 2, wherein the step of attaching the thermoplastic structure on the thermoplastic layer at the cutout comprises injection molding a thermoplastic injection-molding material in the region of the cutout.

4. The process as claimed in claim 2, wherein the step of attaching the thermoplastic structure on the thermoplastic layer via the cutout comprises attaching the thermoplastic structure by welding.

5. The process as claimed in claim 1, wherein, prior to the processing step, the thermoplastic layer comprises a thermoplastic organopanel of either a thermoplastic film or a thermoplastic sheet.

6. The process as claimed in claim 1, wherein either the first or second thermoset prepreg layer comprises a plurality of mutually superposed prepregs.

7. The process as claimed in claim 1, wherein the first and second thermoset prepreg layers each comprises a fiber material composed of glass, aramid, carbon or Kevlar in a thermoset matrix.

8. The process as claimed in claim 1, wherein, prior to the processing step, the thermoplastic layer comprises a thermoplastic layer including a fiber material composed of glass, aramid, carbon or Kevlar in a thermoplastic matrix.

9. The process as claimed in claim 2, further comprising attaching the thermoplastic structure to the thermoplastic layer through the cutout after the processing step is complete.

10. The process as claimed in claim 1, wherein the thermoplastic layer is accessible through only the cutout.

* * * * *